United States Patent
Krompaß et al.

(10) Patent No.: US 12,456,057 B2
(45) Date of Patent: Oct. 28, 2025

(54) METHODS FOR BUILDING A DEEP LATENT FEATURE EXTRACTOR FOR INDUSTRIAL SENSOR DATA

(71) Applicant: Siemens Aktiengesellschaft, Munich (DE)

(72) Inventors: Denis Krompaß, Munich (DE); Hans-Georg Köpken, Erlangen (DE); Tomislav Tomov, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1051 days.

(21) Appl. No.: 17/426,366

(22) PCT Filed: Jan. 17, 2020

(86) PCT No.: PCT/EP2020/051127
§ 371 (c)(1),
(2) Date: Jul. 28, 2021

(87) PCT Pub. No.: WO2020/156835
PCT Pub. Date: Jun. 8, 2020

(65) Prior Publication Data
US 2022/0101125 A1 Mar. 31, 2022

(30) Foreign Application Priority Data
Jan. 31, 2019 (EP) .................................. 19154667

(51) Int. Cl.
*G06N 3/09* (2023.01)
*G06N 3/08* (2023.01)
*G06N 3/096* (2023.01)

(52) U.S. Cl.
CPC ............... *G06N 3/096* (2023.01); *G06N 3/08* (2013.01)

(58) Field of Classification Search
CPC .......... G06N 3/08; G06N 3/045; G06N 3/084; G06N 3/096; G06N 3/0455; G06N 3/0475; G06N 3/04
See application file for complete search history.

(56) References Cited

U.S. PATENT DOCUMENTS 9,715,496 B1 * 7/2017 Sapoznik ............. G06Q 30/016
9,792,823 B2 * 10/2017 Zhuang .................... G09B 5/00
(Continued)

FOREIGN PATENT DOCUMENTS

| CN | 106447039 A | 2/2017 |
|---|---|---|
| CN | 107808163 A | 3/2018 |

(Continued)

OTHER PUBLICATIONS

"Heung-Il Suk ; "Latent feature representation with stacked auto-encoder for AD/MCI diagnosis" Original Article, Published: Dec. 22, 2013, vol. 220, pp. 841-859, (2015) " (Year: 2015).*

(Continued)

*Primary Examiner* — Paul M Knight
(74) *Attorney, Agent, or Firm* — Lempia Summerfield Katz LLC (57) ABSTRACT

The present disclosure relates to a method of and a system for building a latent feature extractor as well as a neural network including a latent feature extractor built by the method and/or with the system. The method includes providing non-uniform training data for a multitude of tasks and optimizing parameters of a neural network of the latent feature extractor based on the multitude of tasks.

17 Claims, 4 Drawing Sheets

(56) References Cited

U.S. PATENT DOCUMENTS

| | | | |
|---|---|---|---|
| 9,864,951 B1* | 1/2018 | Makhijani | G06Q 30/0282 |
| 10,149,958 B1* | 12/2018 | Tran | G16H 50/20 |
| 10,923,213 B2* | 2/2021 | Fusi | G06N 20/00 |
| 11,449,746 B2* | 9/2022 | Baldwin | G06N 20/20 |
| 11,645,508 B2* | 5/2023 | Hwang | G06N 3/08 706/25 |
| 2008/0013821 A1* | 1/2008 | Macgregor | G06T 7/0006 382/141 |
| 2011/0010319 A1* | 1/2011 | Harada | G06V 10/443 706/12 |
| 2011/0106743 A1* | 5/2011 | Duchon | G06F 16/35 706/46 |
| 2011/0257932 A1* | 10/2011 | Chu | G05B 23/0221 702/179 |
| 2013/0097158 A1* | 4/2013 | Pobbathi | G06F 16/9535 707/723 |
| 2015/0213361 A1* | 7/2015 | Gamon | G06N 20/00 706/12 |
| 2015/0310862 A1* | 10/2015 | Dauphin | G06F 40/30 704/257 |
| 2015/0371241 A1* | 12/2015 | Ioannidis | G06Q 30/0269 705/7.29 |
| 2016/0162576 A1* | 6/2016 | Ariño de la Rubia | G06F 21/602 707/739 |
| 2016/0342888 A1* | 11/2016 | Yang | G06V 10/454 |
| 2017/0092021 A1* | 3/2017 | Nielsen | G07C 5/0808 |
| 2017/0140245 A1* | 5/2017 | Kraft | G06F 18/214 |
| 2017/0294027 A1* | 10/2017 | Babenko | G06T 7/507 |
| 2017/0300605 A1* | 10/2017 | Ardis | G05B 23/024 |
| 2017/0372220 A1* | 12/2017 | Krishnamurthy | G06N 7/01 |
| 2018/0053002 A1* | 2/2018 | El-Moussa | G06N 3/047 |
| 2018/0054451 A1* | 2/2018 | El-Moussa | G06N 3/044 |
| 2018/0060575 A1* | 3/2018 | El-Moussa | G06N 3/044 |
| 2018/0060581 A1* | 3/2018 | El-Moussa | G06F 21/554 |
| 2018/0060582 A1* | 3/2018 | El-Moussa | G06N 3/044 |
| 2018/0067967 A1* | 3/2018 | Miyahara | G06V 20/53 |
| 2018/0089534 A1* | 3/2018 | Ye | G06V 40/173 |
| 2018/0091531 A1* | 3/2018 | El-Moussa | H04L 63/1416 |
| 2018/0158078 A1* | 6/2018 | Hsieh | G06N 20/00 |
| 2018/0225812 A1* | 8/2018 | DiVerdi | G06V 10/764 |
| 2018/0232900 A1* | 8/2018 | Kraft | G06V 10/255 |
| 2018/0314735 A1* | 11/2018 | Liu | G06N 20/00 |
| 2018/0342322 A1* | 11/2018 | Apte | G16H 20/00 |
| 2018/0351775 A1* | 12/2018 | Zhang | G01S 13/50 |
| 2018/0358005 A1* | 12/2018 | Tomar | G06F 40/30 |
| 2019/0244107 A1* | 8/2019 | Murez | G06V 10/764 |
| 2020/0371491 A1 | 11/2020 | Wong | |
| 2022/0188897 A1* | 6/2022 | Szeli | G06T 7/70 |

FOREIGN PATENT DOCUMENTS

| | | |
|---|---|---|
| CN | 108460152 A | 8/2018 |
| GB | 201717651 | 12/2017 |

OTHER PUBLICATIONS

"Ali Abd Almisreb et al., Utilizing AlexNet Deep Transfer Learning for Ear Recognition, 2018, 2018 Fourth International Conference on Information Retrieval and Knowledge Management" (Year: 2018).*
"Jinlin Zhu et al., HMM-Driven Robust Probabilistic Principal Component Analyzer for Dynamic Process Fault Classification, IEEE Transactions On Industrial Electronics, vol. 62, No. 6, Jun. 2015" (Year: 2015).*
NPL Simonyan Two Stream Convolutional Networks 2014.*
NPL Collobert A Unified Architecture for Natural Language Processing 2008.*
NPL Prechelt Early Stopping But When 2012.*
NPL Suk Deep Learning Based Feature Representation 2013.*
NPL Suk Latent feature representation with stacked auto encoder 2013.*
NPL Andrews Transfer Representation Learning for Anomaly Detection 2016.*
NPL Asgarian An Introduction to Transfer Learning 2018.*
NPL Chalapathy Anomaly Detection One Class NNs Jan. 11, 2019.*
NPL Chalapathy Deep Learning for Anomaly Detection Jan. 9, 2019.*
NPL Coates An Analysis of Single Layer Networks 2011.*
NPL Kandaswamy Improving Transfer Learning Accuracy 2014.*
NPL Maaloe Auxiliary Deep Generative Models 2016.*
NPL Mathworks Improve Shallow Neural Network Generalization 2018.*
NPL Mighan Deep Learning based latent feature extraction 2018.*
NPL Pan Transfer Learning via Dimensionality Reduction 2008.*
NPL Weiss A survey of transfer learning 2016.*
NPL Wen A New Deep Transfer Learning Jan. 1, 2019.*
Collobert, Ronan, and Jason Weston. "A unified architecture for natural language processing: Deep neural networks with multitask learning " Proceedings of the 25th international conference on Machine learning. 2008. pp. 160-167.
PCT International Search Report and Written Opinion of International Searching Authority mailed Mar. 12, 2020 corresponding to PCT International Application No. PCT/EP2020/051127.
Simonyan, Karen, and Andrew Zisserman. "Two-stream convolutional networks for action recognition in videos." arXiv preprint arXiv:1406.2199 (2014). pp. 1-11.
International Preliminary Report on Patentability for International Patent Application PCT/EP2020/051127 mailed Apr. 30, 2021.
Huang Ying et al. "Chinese Word Sense Disambiguation Based on Hidden Feature Extraction and C R F Model"; College of Computer Science and Technology, Guizhou University, Guiyang 550025 China; Dec. 15, 2013, with machine translation.

* cited by examiner

METHODS FOR BUILDING A DEEP LATENT FEATURE EXTRACTOR FOR INDUSTRIAL SENSOR DATA

The present patent document is a § 371 nationalization of PCT Application Serial No. PCT/EP2020/051127, filed Jan. 17, 2020, designating the United States, which is hereby incorporated by reference, and this patent document also claims the benefit of European Patent Application No. 19154667.0, filed Jan. 31, 2019, which is also hereby incorporated by reference.

TECHNICAL FIELD

The present disclosure relates to a method of and a system for building a latent feature extractor as well as a neural network including the latent feature extractor built by the method and/or with the system.

BACKGROUND

Today, labelled data is an important ingredient for enabling machine learning based artificial intelligence (AI) solutions to solve new and challenging automation tasks. Labelled data describes datasets that have been specifically annotated by domain knowledge with a specific problem setting in mind such that the parameters of a machine learning model may be optimized by examples.

For example, in an image classification problem, a method may automatically detect whether a person is present in an image recorded by a camera. The current state of the art in solving this problem with methods from the domain of machine learning requires to build a labelled dataset that contains images and corresponding labels that indicate whether a person is present or not in each image. Given this labelled dataset, the machine learning algorithm may learn a function that maps input pixels to a classification by repeatedly viewing examples from the labelled dataset. Even though building such a dataset sounds quite straight forward, it may be incredibly labor and cost intensive if not even infeasible because, depending on the complexity of the target problem, thousands to millions of these labelled data instances are required.

In the industrial domain, labelling a sufficient amount of data is hard if not even infeasible. The reason for this lies in the fact that, in contrast to the common domain where basically anybody may label data (e.g., determine whether an image shows a cat or a dog), in the industrial domain only a very small amount of highly specialized domain experts are able to label data (e.g., annotate the condition of a gas turbine). Unfortunately, the most advanced and promising methods from the field of AI, especially Deep Learning, require huge amounts of labelled data for learning complex relationships between inputs and the target task to solve.

There are basically two ways to solve this problem. The first is to invest large amounts of money in training a workforce of highly specialized data labelers that build the required labelled datasets for every single target problem for which an AI solution based on machine learning is pursued. This approach is not very attractive because it is very labor intensive and expensive and also requires access to a large pool of (e.g., external) data which is not feasible in many cases. The second approach relies on classic domain specific feature engineering based on established signal processing methods like Fast Fourier Transform (FFT), Wavelets, or moving statistics to name a few. If these features significantly facilitate the learning task, the amount of required labelled data will also be reduced. Applying this approach may be seen as manual feature extraction where the input sensor signals are represented (e.g., embedded) in a new interpretable space. However, such feature engineering may not be possible as not always a suitable signal processing method exists/is applicable.

Karen Simonyan et al. disclose in "Two-Stream Convolutional Networks for Action Recognition in Videos" a two-stream ConvNet architecture which incorporates spatial and temporal networks. The architecture is used exclusively for video recognition and thereto split into two separate streams. The two-stream ConvNet is trained on video data of two different sets, UCF-101 and HMDB-51, that are of the same domain, namely video data, and may be combined into one single training set.

Ronan Collobert et al. disclose in "A unified architecture for natural language processing" a single convolutional neural network architecture that processes sentences and outputs a host of language processing predictions using a language model. The network is trained jointly on different tasks using weight-sharing, an instance of multitask learning.

Consequently, there is a need for a way to reduce the amount of labelled data necessary for training neural networks for AI solutions in the industrial field where non-uniform and multidimensional data (e.g., different sensor data) is the input.

SUMMARY AND DESCRIPTION

Therefore, the present disclosure provides a method for building a latent feature extractor and a system of building a latent feature extractor as well as a neural network.

The scope of the present disclosure is defined solely by the appended claims and is not affected to any degree by the statements within this summary. The present embodiments may obviate one or more of the drawbacks or limitations in the related art.

According to a first aspect, a method of building a latent feature extractor includes: providing non-uniform training data including $k_T$ training examples for each single task T of a multitude of $T_i$ tasks; and optimizing parameters θ of a neural network (NN) of the latent feature extractor based on the multitude of $T_i$ tasks.

Thereto, the following acts are executed iteratively until the parameters θ have converged: randomly selecting a single task T from the multitude of $T_i$ tasks for optimizing the parameters θ; and sampling the current randomly selected task T for $n_j$ iterations with the respective $k_T$ training examples of the non-uniform training data for optimizing the parameters θ based on the current randomly selected task T.

In each iteration n of the $n_j$ iterations, the following acts are executed: extracting latent features from a training signal of the current training example k of the respective training examples $k_T$ with the latent feature extractor; and deriving an output signal $o_i$ for the current randomly selected task T from the extracted latent features with a respective task module of the current randomly selected task T.

According to a second aspect, a system for building a latent feature extractor arranged and configured for executing the method as described above includes the latent feature extractor and task modules. The latent feature extractor is utilized for extracting the latent features. The latent feature extractor is shared for each task T of the multitude of Ti tasks. The task modules for each single task T of the multitude of Ti tasks are located downstream the latent feature extractor and utilized for deriving the output signal $o_i$ for the respective task T.

According to a third aspect, a neural network (NN), (e.g., a deep NN and in particular an (deep) industrial NN), includes a latent feature extractor, a combiner module in case multiple input signals are provided to the neural network and a specific task module. The latent feature extractor is built by the method and/or with the system as described above. The combiner module is located downstream the latent feature extractor. The specific task module is located downstream the latent feature extractor and (if present) the combiner module, respectively.

In order to reduce the amount of labelled training data the specific target task is not learned from scratch but model parameters θ of the latent feature extractor are pre-initialized to a reasonable starting point. This may be seen as equipping the (deep) (industrial) NN (=model) with some amount of prior domain knowledge beforehand which lowers the amount of required labelled examples to solve the target task tremendously. As mentioned above, in the industrial domain, labelled data is a major bottleneck for implementing AI solutions based on machine learning. Having pre-trained models including general latent feature extractors (e.g., pre-trained (deep) NN) that automatically extract latent features from general industrial sensor data such as temperatures, torques, current, and voltage profiles do reduce the amount of labelled training data needed to train an industrial neuronal network for a specific task.

In the following first various (deep) (industrial) neural network architecture concepts that are of interest for learning a latent feature extractor for industrial sensor data are described.

In one scenario, the input to the (deep) NN/model includes a single signal. For example, the input to the model includes a single sequence of fixed length like 1 s [second] of torque measurements of the spindle in a milling machine measured with a 500 hz [Hertz] frequency, which results in 500 values per input. Given the context of the data the data has to be properly normalized such that the values are not too large or too low. Min-max normalization or centering the data and scaling to unit variance or just scaling the values by some other constant (e.g., observed standard deviation within the complete data) may be utilized. The normalized signal will be fed into the subsequent (deep) NN. The (deep) NN consumes the normalized input signal and produces outputs optimized for a specific target task. For example, for an anomaly detection scenario, the model might output the probability that the input signal contains an anomaly or in an activity recognition task class probabilities for various activities that might have generated the input signal. The (deep) NN architecture may be subdivided into two modules (which are optimized end-to-end not independently later on), the (general) latent feature extractor ((deep) "sub-NN") and a specific task module ((deep) "sub-NN"). The latent feature extractor consumes the normalized sensor signal data and outputs a latent feature/embedding of that input signal. The latent feature extractor represents a function that encodes the input sensor signal(s) into a latent feature space where each feature represents meaningful information extracted from the input data that is useful for the downstream specific task module. Here, the latent feature extraction is performed by a (deep) NN that includes multiple 1D convolutional neural network layers that are stacked on top of each other. With a deeper architecture, the model may extract locally detected latent features and further combine them in a hierarchical fashion in the deeper layers. The (deep) NN architecture might further contain some other components like batch normalization layers or skip connections to stabilize the training of the components. The specific task module consumes the latent features produced by the latent feature extractor and produces outputs required for the specified target task. The specific task module is a (deep) neural network that combines the latent features and produces values meaningful for the specific target problem (e.g., an anomaly probability, class probabilities, or any other value).

In a more complex scenario, the input to the (deep) (industrial) NN/model includes multiple input signals. Each of the input signals to the approach includes a single sequence of fixed length, for example 1 s of torque measurements of the spindle and the x, y, z coordinates of the spindle in a milling machine measured with a 500 hz frequency, which results in 500 values per input signal. Like described above, the input data needs to be normalized. In contrast to the single input scenario, each of the types of the input signals have to be normalized individually if they were not measured by a related sensor. For example, a torque measurement needs to be normalized differently than a coordinate measurement. The resulting normalized signal will be fed into the (deep) (industrial) NN. The (deep) NN consumes the normalized input signal and produces outputs optimized for the specific target task (e.g., anomaly detection scenario or activity recognition task). The (deep) NN architecture may be subdivided into three modules (which are optimized end-to-end not independently later on). The latent feature extractor ((deep) "sub"-NN) consumes each of the normalized sensor signals individually and outputs latent features/embeddings for each of the input signals. The latent feature extractor represents a function that encodes each single input sensor signal into a latent feature space where each features represent meaningful information extracted from the input data that is useful for the downstream modules. As described before, the latent feature extraction is performed by a (deep) NN that includes multiple 1D convolutional neural network layers that are stacked on top of each other. With a deeper architecture, the model may extract locally detected latent features and further combine them in a hierarchical fashion in the deeper layers. The deep neural network architecture might further contain some components like batch normalization layers or skip connections to stabilize the training of the (deep) NN. The combiner module combines the latent features produced by the latent feature extractor for every input signal in a reasonable way. In one case, the latent features are concatenated, added, or multiplied. In more complex scenarios, the combiner is also a (deep) "sub-NN" that learns meaningful combinations of the various latent features extracted from each input signal. The output of the combiner module is fed into the specific task module. The specific task module consumes the combined latent features produced by the combiner module and produces outputs required for the specific target task. The specific task model is a (deep) "sub-NN" that combines latent features and produces values meaningful for the target problem (e.g. an anomaly probability, class probabilities or any other value). The (deep) (industrial) NN is hence a combination of the (deep) "sub-NN" of the latent feature extractor and the combiner module (if present) and the (deep) "sub-NN" of the specific task module.

The general latent feature extractor is built or pre-trained in a multi-task training setting. In order to train the latent feature extractor on a general level, multiple different tasks $T_i$ are optimized in the pre-training while the latent feature extractor is shared between all the different tasks $T_i$. The combiner modules and of course the task modules are not shared. This means that during pre-training of the general latent feature extractor all tasks $T_i$ optimize the same (deep) NN of the general latent feature extractor, which is responsible for extracting the useful features from the various non-uniform input industrial sensor signals.

Based on the non-uniform training data the (general) latent feature extractor is built or rather pre-trained. For each of the $T_i$ different tasks, which are used for building/pre-training the latent feature extractor, the non-uniform training data includes a predefined number of $k_T$ training examples. The $T_i$ tasks may include several tasks with multiple input signals and some tasks with only one input signal. The different tasks may cover different problems in the industrial field, for example, error/fault detection, state detection or prediction, security issues, etc. For example, a task with multiple input signals may be detection of anomalies in the operation of a gas turbine (e.g., probability thereof) based on different sensor signals having different dimensions including rotational speed, torque, current load, vibrations of the drive shaft, state of stress of the turbine blades, and the like. An exemplary task with only one single sensor input signal may be the detection of faulty electrical components based on a current profile at a power source. The more different the tasks are (e.g., underlying problem and used input signals) the more general the resulting latent feature extractor will be.

For each of the different tasks used for training the (general) latent feature extractor corresponding labelled training data has to be provided. Due to the different tasks, the provided training data is non-uniform (e.g., different number of input signals as well as different values and dimensions). The non-uniform training data used for building/pre-training the (general) latent feature extractor includes a predefined number of training examples for each of the different tasks.

The (general) latent feature extractor is based on its (deep) NN. The (deep) NN includes the internal parameters $\theta$. During pre-training of the (deep) NN of the latent feature extractor, the parameters $\theta$ are optimized.

The optimizing is done by first randomly selecting one single task T of the multitude of $T_i$ different tasks. The selection of the tasks is random and based on an equal probability p(T) for all tasks such that during the process of optimizing the parameters $\theta$ each of the tasks $T_i$ may be selected nearly equally.

Subsequently, the randomly selected task T is sampled based on the corresponding $k_T$ training examples of the non-uniform training data for $n_j$ iterations. The number of iterations $n_j$ is predefined. Sampling means feeding the current training signals of the current training example to the latent feature extractor, and based on latent features generated by the latent feature extractor, deriving the current output $o_i$ by the respective task module for the current randomly selected task T. Based on the generated output $o_i$ of the current task T, the parameters $\theta$ are then adjusted such that the next output $o_i$ will as closely as possible approximate to a given result of the current training example. In other words, (latent) features are extracted from the training signal(s) of the current training example k by the latent feature extractor based on the current parameters $\theta$. Then, the extracted latent features are processed by the respective task module for the current task T and the output $o_i$ is generated. The output $o_i$ is compared to the given result of the current training example. Based on the difference between the current generated output $o_i$ and the result, the parameters $\theta$ are adjusted such that the next output $o_i$ will more closely approximate to the given result of the next training example. The parameters $\theta$ may be adjusted with a stochastic gradient descent based optimizer. In each iteration of the $n_j$ iterations, the current randomly selected task T is sampled with all k training examples.

After one randomly selected task T has been sampled for the $n_j$ iterations, the next task T of the multitude of tasks $T_i$ is randomly selected and subsequently sampled for $n_j$ iterations. The random selection and subsequent sampling of tasks is continued until the parameters $\theta$ of the (general) latent feature extractor converge. Converging means that after one task T has been sampled in the $n_j$ iterations the parameters do not have changed by more than a predefined threshold.

During optimizing the parameters $\theta$ of the latent feature extractor, parameters of each of the $T_i$ tasks are also optimized. However, these parameters are not part of the latent feature extractor and may thus be disregarded.

For tasks having more than one input signal, after the (general) latent feature extractor has extracted the (latent) features from the current training example k for the current randomly selected task T, a combiner module for the respective task T (as described above) may combine the extracted features (e.g., by concatenating them or in a meaningful way) before the extracted features are provided to the respective task module of the current task T.

An exemplary pre-training algorithm is outlined in pseudo code below:
1. Pre-process the data (normalizing)
2. Randomly initialize the parameters $\theta$
3. While $\theta$ not converged
4. Sample a random task T of $T_i$ (~p(T))
5. For $n_j$ iterations:
6. Sample $k_T$ training examples for Task T
7. Use the task module (model) for task T to evaluate and update the parameters $\theta$ (with a stochastic gradient descent based optimizer)
8. End for
9. End while With the described pre-training scheme, a general or common feature extractor is built that produces useful latent features or signal embeddings that are valuable to all downstream tasks. Thus, the latent feature extractor is of general nature and also valuable to other tasks not used during the pre-training. Note that the tasks $T_i$ are not related, meaning the first task may be classifying activities from sensor signals produced by sensors attached to the human body while in movement (e.g., smart watch/fitness tracker), while the next task includes an anomaly classification problem on daily gas turbine sensor data or a tool break detector in a milling machine based on machining sensor data. During pre-training, the latent feature extractor is embedded in various architectures (e.g., $T_i$ different tasks) which try to solve a diverse set of tasks independently, yet they have to use and adapt the same latent feature extractor. This way the latent feature extractor produces meaningful and general latent features that are beneficial for all $T_i$ tasks. Thereby, the latent feature extractor is directly optimized to serve the desired general purpose.

A (deep) (industrial) NN (as described above) includes the (general) latent feature extractor ((deep) "sub-NN") pre-trained as described above. The NN further includes the specific task module for (model of) the specific task the industrial NN is intended for ((deep) "sub-NN") and, in case more than one input signal is processed by the NN, a combiner module between the latent feature extractor and the specific task module. The NN has to be trained for the specific task before it may be utilized. Due to the pre-trained (general) latent feature extractor, significantly less training examples need to be provided for training of the industrial NN. During the training of the NN, the parameters θ of the latent feature extractor ((deep) "sub-NN") are not changed anymore. However, in order to further fine tune the whole NN the parameters θ of the latent feature extractor ((deep) "sub-NN") may be further adjusted.

Having access to a general latent feature extractor for industrial sensor data is a very powerful asset. Given such feature extractor, one may integrate it in an architecture of an industrial NN as feature extraction component. For new (industrial) tasks, the developer has to only train the specific task module or the combiner module and task module, respectively, which are of significantly lower complexity than the latent feature extractor. Of course, the developer has the freedom to further tune the latent feature extractor if needed. For this reason, only a relatively low amount of labelled training data is required to optimize the complete (deep) (industrial) NN/model for the specific (industrial) task. A decrease in the required amount of labelled training data by a factor of up to 1000 may be achieved. Further, such pre-trained (deep) (industrial) NNs/machine learning models enable a larger pool of developers to transfer quickly to new and complex industrial problems in a shorter period of time without the requirement to build and maintain large labelled datasets or to set up an infrastructure to train and evaluate large and complex models on these datasets. It greatly reduces the need for domain specific feature engineering because the feature extraction is performed automatically. In addition, the time for training will also be significantly reduced, resulting in faster development iterations and a greater chance of success by reducing both, labor cost and time at the same time. Hence, the (general) latent feature extractor described above has the potential to dramatically increase the speed and scale of AI based solution development based on non-uniform input signals like industrial sensor data together with a decrease in labor and costs.

According to a refinement, the non-uniform training data are sensor data from different sensors.

The senor data includes signals that are based on different physical variables like temperature, humidity, pressure, tension, strain, force, acceleration, velocity, distance, voltage, current, flow, etc. These signals have different dimensions and value ranges. Thus, the resulting training data is very non-uniform.

Consequently, the resulting (general) latent feature extractor provides meaningful latent features for a wide variety of industrial applications or problems.

According to a refinement, $T_i$ is in a range of 2 to 1000 and in a range of 2 to 100 and/or wherein $n_j$ is in a range of 1 to 10000 and/or wherein each $k_T$ is equal to one of 32, 64, or 128.

A robust general latent feature extractor may be generated by pre-training with about $T_i=100$ different tasks, wherein each randomly selected task T is sampled in about $n_j=10000$ iterations with $k_T \in [32, 64, 128]$ corresponding training examples.

According to a refinement, the method further includes normalizing the non-uniform training data before the act of optimizing.

According to a refinement, the (deep) (industrial) neural network further includes a normalizer module upstream the latent feature extractor.

Before the training signal(s) of the non-uniform training data are be provided to the latent feature extractor, either during pre-training of the latent feature extractor or in the (deep) (latent) NN, the signal(s) are normalized by a normalizer module. The normalizing may be done by a min-max normalization or by centering the data and scaling to unit variance or by just scaling the values by some other constant (e.g., observed standard deviation within the complete data). Thus, the latent feature extractor is provided with values that are all in the same range.

According to a refinement, the $k_T$ training examples for each task T include one or multiple training signals from one or multiple sensors.

By pre-training the latent feature extractor with non-uniform training data including training examples, some of which having one training signal and several of which having more than one training signal, for the $T_i$ tasks generality of the resulting latent feature extractor may be provided. Here some of the $T_i$ tasks correspondingly consume one input signal from one sensor and several of the $T_i$ tasks consume multiple input signals from multiple sensors.

According to a further refinement, in each iteration n of the $n_j$ iterations where the $k_T$ training examples for the current randomly selected task T include multiple training signals, in the act of extracting, features are extracted for every training signal of the multiple training signals. Further, in each iteration n of the $n_j$ iterations where the $k_T$ training examples for the current randomly selected task T includes multiple training signals the following act is additionally executed: combining the extracted latent features of each training signal of the multiple training signals into combined extracted features with a respective combiner module of the current randomly selected task T before the step of deriving.

According to a further refinement, the system further includes downstream the latent feature extractor and upstream the respective task module for each task T where the respective $k_T$ training examples include multiple training signals a combiner module for combining the extracted latent features of each training signal of the multiple training signals.

For each task T having more than one input signal, the latent features extracted from the corresponding multiple training signals by the latent feature extractor have to be combined by the combiner module before they are provided to the respective task module in order to produce an meaningful output $o_i$.

According to a refinement, the latent feature extractor includes 10 to 30 layers and each layer of the latent feature extractor includes 10 to 1000 neurons.

According to a refinement, each task module includes 1 or 2 layers and each layer of the task modules includes 10 to 1000 neurons.

According to a further refinement, each combiner module includes 1 or 2 layers and each layer of the combiner modules includes 10 to 1000 neurons.

According to a refinement, the latent feature extractor of the (deep) (industrial) NN includes 10 to 30 layers includes 10 to 1000 neurons and alternatively or additionally the specific task module of the NN includes 1 or 2 layers includes 10 to 1000 neurons and alternatively or additionally the combiner module includes 1 or 2 layers includes 10 to 1000 neurons.

Due to the reduced complexity of the "sub-NN" of the specific task module and of the combiner module, respectively, compared to the pre-trained latent feature extractor (that does not have to be trained anymore), the amount of labelled training data as well as the time needed for training the (deep) (industrial) NN may be significantly reduced.

BRIEF DESCRIPTION OF THE DRAWINGS

The present disclosure and its technical field are subsequently explained in further detail by exemplary embodiments shown in the drawings. The exemplary embodiments only conduce better understanding of the present disclosure and in no case are to be construed as limiting for the scope of the present disclosure. Particularly, it is possible to extract aspects of the subject-matter described in the figures and to combine it with other components and findings of the present description or figures, if not explicitly described differently. Equal reference signs refer to the same objects, such that explanations from other figures may be supplementally used.

DETAILED DESCRIPTION

Figure 1:
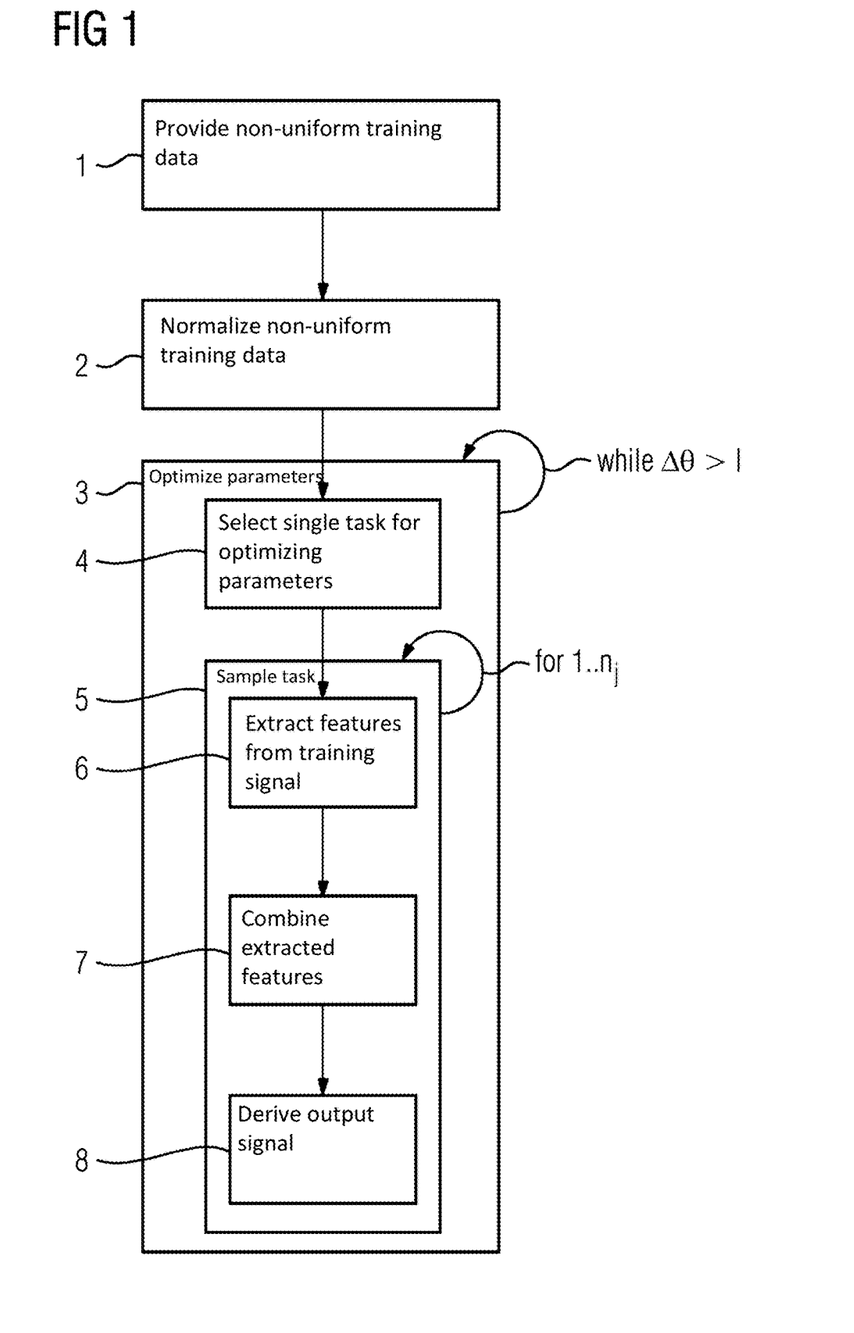
FIG. 1 schematically depict a flow chart of an example of a method of building a latent feature extractor.

In FIG. 1, a flow chart of a method of building a latent feature extractor is schematically depicted. In act 1, non-uniform training data is provided. The non-uniform training data includes $k_T \in [32, 64, 128]$ training examples for each single task T of a multitude of $T_i=100$ tasks. The tasks include industrial applications or problems like deriving a probability of an anomaly in the operation of a gas turbine. Each training example includes one or more sensor signals (e.g., rotational speed, temperature, current load, etc.) and is labelled with a result for the respective task T (e.g., a probability of an anomaly). In an optional second act 2, the non-uniform training data is normalized. The non-uniform training data is normalized by a min-max normalization or by centering the data and scaling to unit variance or by just scaling the values by some other constant (e.g., observed standard deviation within the complete data). In a third iterative act 3, parameters θ of a neural network (NN) of the latent feature extractor are optimized based on the multitude of $T_i$ tasks. Thereto a fourth act 4 and a fifth act 5 are executed iteratively until the parameters θ have converged (Δθ>1). In act 4, a single task T from the multitude of $T_i$ tasks is randomly selected for optimizing the parameters θ. The selecting of the tasks T is based on an equal probability p(T) for all tasks such that during the process of optimizing the parameters θ each of the tasks $T_i$ may be selected nearly equally. In act 5, the current randomly selected task T is sampled for $n_j$ iterations. Thereby, the current randomly selected task T is sampled with the respective $k_T$ training examples of the non-uniform training data. Thereby, the parameters θ are optimized based on the current randomly selected task T. In each iteration n of the $n_j$ iterations, act 6, an optional act 7 and act 8 are executed. In act 6, features from a training signal of the current training example k of the respective training examples $k_T$ are extracted with the latent feature extractor. In optional act 7, the extracted latent features of each training signal of the multiple training signals are combined into combined extracted features with a respective combiner module of the current randomly selected task T. The combiner module is a (deep) "sub-NN" that learns meaningful combinations of the various latent features extracted from each training signal. In act 8, an output signal $o_i$ for the current randomly selected task T is derived from the (e.g., combined) extracted features with a respective task module of the current randomly selected task T. Based on the output $o_i$ the parameters θ are adjusted such that the next output approximates the respective result of the next training example more closely.

Figure 2:
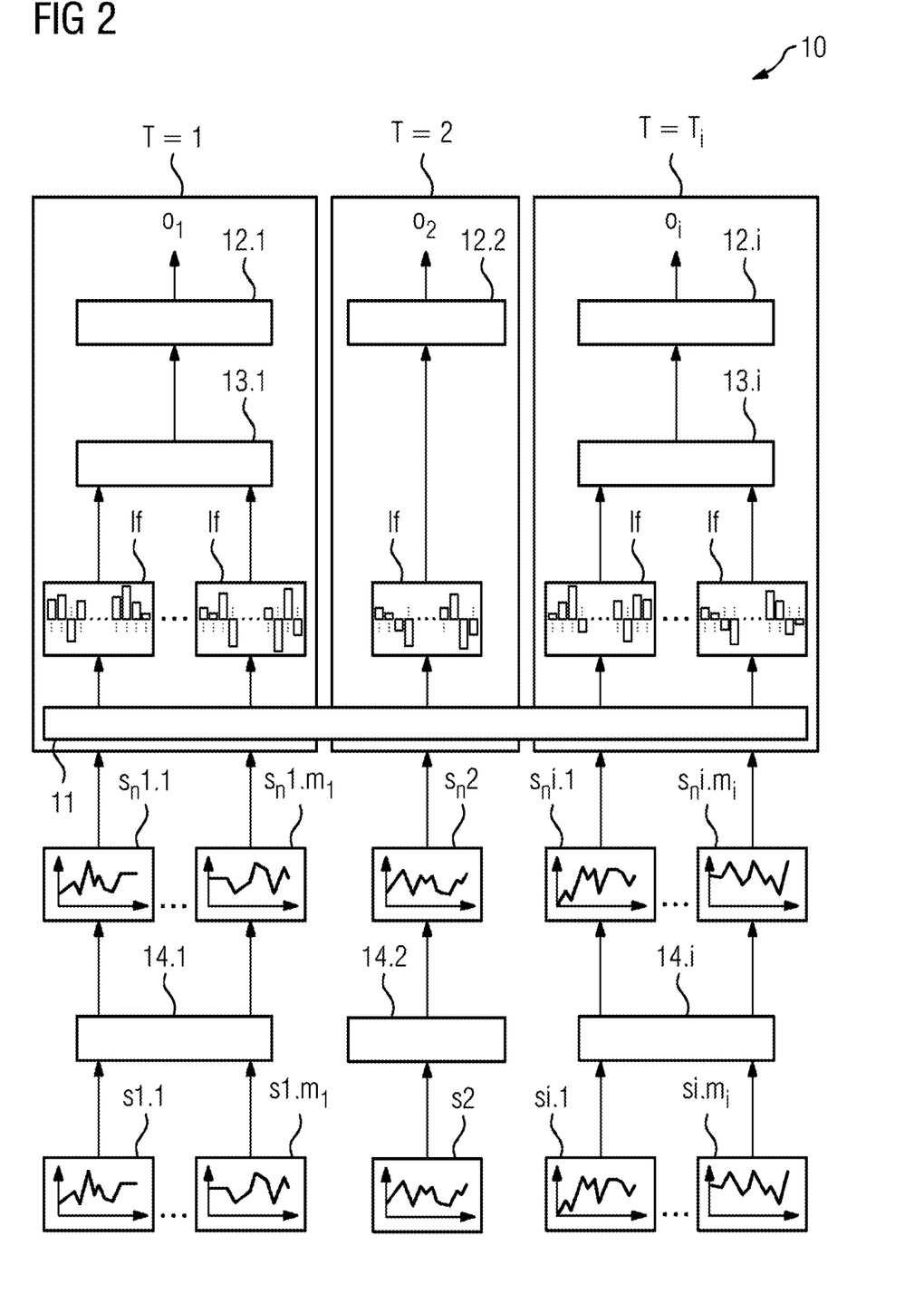
FIG. 2 schematically depict an example of a system for building a latent feature extractor.

In FIG. 2, a system 10 for building a latent feature extractor is schematically depicted. The system 10 is arranged and configured for executing the method of FIG. 1. The system 10 includes a multitude of (deep) NNs one for each of $T_i=100$ tasks (T=1 . . . 100). The NNs of the tasks T share one latent feature extractor 11 ("sub-NN") having 30 layers with 1000 neurons each. Each NN of the tasks $T_i$ includes a respective task module 12.i ("sub-NN") for its task T downstream the latent feature extractor 11, each task module 12.i having 2 layers with 100 neurons each. Further, each NN of the $T_i$ tasks may include an optional combiner module 13.i ("sub-NN") between the latent feature extractor 11 and the respective task module 12.i, each combiner module having 2 layers with 100 neurons each. Further, the system may include optional normalizer modules 14.i for the NNs of the $T_i$ tasks upstream the latent feature extractor 11.

The training signals or rather input signals $si.m_i$ for each of the tasks $T_i$ are optionally normalized in the corresponding normalizer module 14.i. The latent feature extractor 11 extracts the latent features lf from the (normalized) input signals $si.m_i$ ($s_n i.m_i$). The latent feature extractor 11 is shared for each task T of the multitude of $T_i$ tasks. The optional combiner modules 13.i combine the extracted latent features lf for tasks T that consume more than one (normalized) input signal $si.m_i$ ($s_n i.m_i$) (here exemplarily the task T=1 and the task $T=T_i=100$) into combined latent features. The task modules 12.i downstream the latent feature extractor 11 derive the corresponding output signal $o_i$ for the respective task T from the corresponding (combined) latent features. based on the output $o_i$ the parameters θ are adjusted and iteratively optimized.

Figure 3:
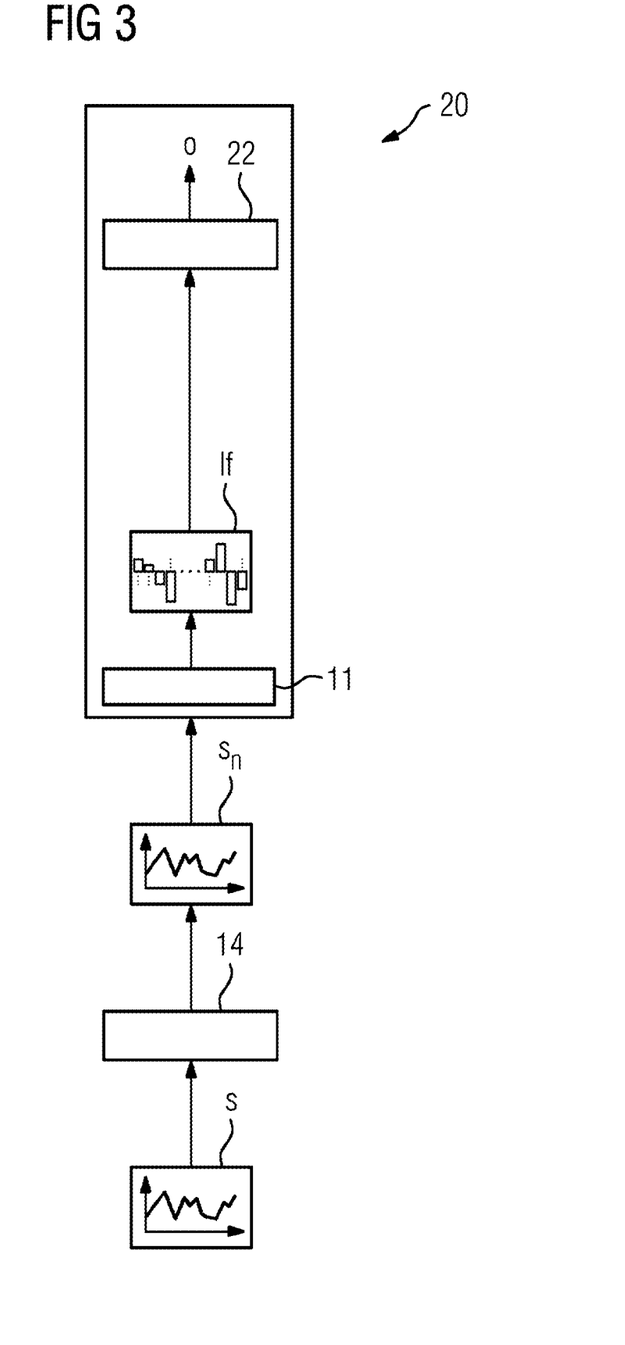
FIG. 3-4 schematically depict two embodiments of a deep industrial network including a latent feature extractor.
Figure 4:
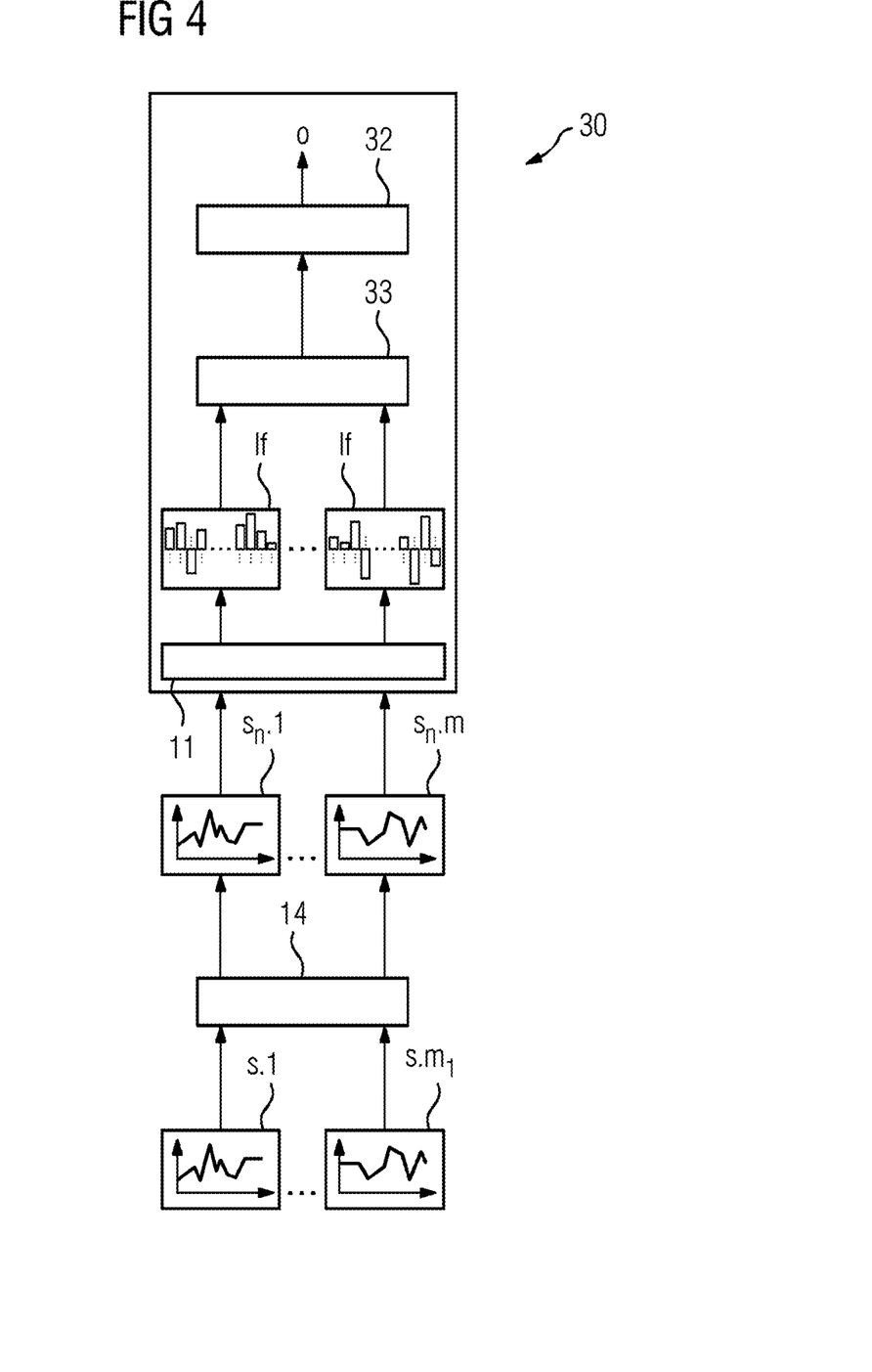

In FIGS. 3 and 4, two exemplary embodiments of a deep industrial NN are schematically depicted.

In FIG. 3, a deep industrial NN 20 for a task consuming only one input signal is schematically depicted. The NN 20 includes a normalizer module 14, a latent feature extractor 11 with 30 layers having 100 neurons each downstream the normalizer module 14 and a specific task module 22 with two layers having 100 neurons each downstream the latent feature extractor 11.

The latent feature extractor 11 has been pre-trained with the method of FIG. 1 and/or the system of FIG. 2. Consequently, the latent feature extractor 11 is able to output latent features lf for various different input signals $s_i$. Here, one input signal s (e.g., a current profile of a power source) is provided to the normalizer module 14. The normalizer module 14 converts the input signal s into a normalized input signal $s_n$. The latent feature extractor 11 extracts a latent feature lf from the normalized input signal $s_n$. The specific task module derives an output o (e.g., presence of a faulty electrical component) from the latent feature lf.

As the latent feature extractor 11 is pre-trained and much more complex (30 layers with 1000 neurons each) than the specific task module 22 (2 layers with 100 neurons each), the training of the NN 20 for the specific task (e.g., deriving if a faulty electrical component is present based on the current profile of a power source) is much faster and requires significantly less labelled training data then a conventional NN without pre-trained feature extractor.

In FIG. 4, a deep industrial NN 30 for a task consuming more than one input signal is schematically depicted. In the following, only differences to the NN 20 of FIG. 3 are described. The NN 30 includes a specific task module 32 with two layers having 100 neurons each downstream the latent feature extractor 11 and additionally a combiner module 33 with two layers having 100 neurons each between the latent feature extractor 11 and the specific task module 32.

Here, more than one input signal s.1 ... s.m$_i$ (m$_i$>1) (e.g., a rotational speed, a tension state of turbine blades, and a current load of a gas turbine) is provided to the normalizer module 14. The normalizer module 14 converts the input signals s.1 ... s.m$_i$ into normalized input signals s$_n$.1 ... s$_n$.m$_i$. The latent feature extractor 11 extracts latent features lf from the normalized input signals s$_n$.1 ... s$_n$.m$_i$. The combiner module 33 combines the latent features if to a combined latent feature. The specific task module 32 derives an output o (e.g., probability of an abnormal operation state) from the combined latent feature provided by the combiner module 33.

As the latent feature extractor 11 is pre-trained and much more complex (30 layers with 1000 neurons each) than the specific task module 32 and the combiner module 33 (2 layers with 100 neurons each) the training of the NN 30 for the specific task (e.g., deriving if an abnormal operation state is present in a gas turbine) is much faster and requires significantly less labelled training data then a conventional NN without pre-trained feature extractor.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. This application may be intended to cover any adaptations or variations of the specific embodiments discussed herein.

In the foregoing detailed description, various features are grouped together in one or more examples for the purpose of streamlining the disclosure. It is understood that the above description is intended to be illustrative, and not restrictive. It is intended to cover all alternatives, modifications and equivalents as may be included within the scope of the disclosure. Many other examples will be apparent to one skilled in the art upon reviewing the above specification.

Specific nomenclature used in the foregoing specification is used to provide a thorough understanding of the disclosure. However, it will be apparent to one skilled in the art in light of the specification provided herein that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed; obviously many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects. In the context of the present description and claims the conjunction "or" is to be understood as including ("and/or") and not exclusive ("either ... or").

The invention claimed is:

1. A method of pre-training a latent feature extractor that is one single sub-neural network for an industrial neural network by pre-initializing parameters of the latent feature extractor for industrial sensor data that automatically extracts latent features from general industrial sensor data such that an amount of labelled training data needed to train the industrial neural network for a specific task is reduced, the method comprising:
   receiving, by the industrial neural network, non-uniform training data comprising training examples for each single task of a multitude of tasks covering different problems in an industrial field; and
   optimizing the parameters of the latent feature extractor of the industrial neural network, by the latent feature extractor of the industrial neural network, based on the multitude of tasks, wherein the following acts are executed iteratively until the parameters of the latent feature extractor have converged:
      randomly selecting a single task from the multitude of tasks for optimizing the parameters of the latent feature extractor; and
      sampling the randomly selected single task for iterations with the respective training examples of the non-uniform training data for optimizing the parameters of the latent feature extractor based on the randomly selected single task, wherein each iteration of the iterations comprises:
         extracting latent features from a training signal of a current training example of the respective training examples with the latent feature extractor; and
         deriving an output signal for the randomly selected single task from the extracted latent features with a respective task module of the randomly selected single task,
      wherein the parameters of the latent feature extractor have converged when, after the randomly selecting of the single task in an n$^{th}$ iteration, the parameters of the latent feature extractor have not changed by more than a predefined threshold; and
   providing the pre-trained latent feature extractor to the industrial neural network when training the industrial neural network for the specific task.

2. The method of claim 1, wherein the non-uniform training data are sensor data from different sensors.

3. The method of claim 1, wherein the multitude of tasks is in a range of 2 to 1000, and/or
   wherein a number of iterations is in a range of 1 to 10000.

4. The method of claim 3, wherein the multitude of tasks is in a range of 2 to 100.

5. The method of claim 1, further comprising:
   normalizing the non-uniform training data prior to the optimizing of the parameters of the latent feature extractor.

6. The method of claim 1, wherein the training examples for each task comprise one or multiple training signals from one or multiple sensors.

7. The method of claim 6, wherein, in each iteration of the iterations where the training examples for the randomly selected single task comprise multiple training signals, the extracting of latent features comprises extracting latent features for every training signal of the multiple training signals, and the method further comprises:
  combining the extracted latent features of each training signal of the multiple training signals into combined extracted features with a respective combiner module of the randomly selected single task before the deriving of the output signal.

8. The method of claim 1, wherein the parameters of the latent feature extractor relate to weights and biases of the industrial neural network.

9. A system for pre-training a latent feature extractor that is a sub-neural network for an industrial neural network by pre-initializing parameters of the latent feature extractor for industrial sensor data that automatically extracts latent features from general industrial sensor data such that an amount of labelled training data needed to train the industrial neural network for a specific task is reduced, wherein the system comprises:
  the latent feature extractor configured to extract latent features, wherein the latent feature extractor is shared for each task of a multitude of tasks covering different problems in an industrial field; and
  specific task modules for each single task of the multitude of tasks downstream the latent feature extractor for deriving an output signal for the respective task,
  wherein the latent feature extractor is configured to optimize the parameters of the latent feature extractor of the industrial neural network based on the multitude of tasks until the parameters of the latent feature extractor have converged via an iterative execution of the following:
    randomly selecting a single task from the multitude of tasks for optimizing the parameters of the latent feature extractor; and
    sampling the randomly selected single task for iterations with respective training examples of non-uniform training data for optimizing the parameters of the latent feature extractor based on the randomly selected single task, wherein each iteration of the iterations comprises:
      extracting latent features from a training signal of a current training example of the respective training examples with the latent feature extractor; and
      deriving an output signal for the randomly selected single task from the extracted latent features with a respective task module of the randomly selected single task,
  wherein the parameters of the latent feature extractor have converged when, after the selecting of the single task in an $n^{th}$ iteration, the parameters of the latent feature extractor have not changed by more than a predefined threshold, and
  wherein the pre-trained latent feature extractor is configured to be provided to the industrial neural network when training the industrial neural network for the specific task.

10. The system of claim 9, wherein the system is configured to normalize non-uniform training data prior to the optimization of the parameters of the latent feature extractor.

11. The system of claim 9, wherein the latent feature extractor comprises 10 to 30 layers and wherein each layer comprises 10 to 1000 neurons.

12. The system of claim 9, wherein each task module comprises 1 or 2 layers and wherein each layer comprises 10 to 1000 neurons.

13. The system of claim 9, wherein, in each iteration of the iterations where training examples for a selected task of the multitude of tasks comprise multiple training signals, the extracting of latent features comprises extracting latent features for every training signal of the multiple training signals, and
  wherein the system further comprises at least one combiner module configured to execute downstream of the latent feature extractor and upstream of the respective task module for each task where the respective training examples comprise multiple training signals for combining the extracted latent features of each training signal of the multiple training signals.

14. The system of claim 13, wherein each combiner module of the at least one combiner module comprises 1 or 2 layers, and
  wherein each layer comprises 10 to 1000 neurons.

15. A system for executing an industrial neural network, the system comprises:
  a latent feature extractor;
  a combiner module downstream the latent feature extractor in case multiple input signals are provided to the industrial neural network; and
  a specific task module that is a sub neural network for the industrial neural network downstream the latent feature extractor and the combiner module, respectively,
  wherein the latent feature extractor is pretrained by:
    providing non-uniform training data comprising training examples for each single task of a multitude of tasks covering different problems in an industrial field; and
    optimizing parameters of the latent feature extractor of the industrial neural network based on the multitude of tasks, wherein the following acts are executed iteratively until the parameters of the latent feature extractor have converged:
      randomly selecting a single task from the multitude of tasks for optimizing the parameters of the latent feature extractor; and
      sampling the randomly selected single task for iterations with the respective training examples of the non-uniform training data for optimizing the parameters of the latent feature extractor based on the randomly selected single task, wherein each iteration of the iterations comprises:
        extracting latent features from a training signal of a current training example of the respective training examples with the latent feature extractor; and
        deriving an output signal for the randomly selected single task from the extracted latent features with a respective task module of the randomly selected single task,
    wherein the parameters of the latent feature extractor have converged when, after the selecting of the single task in an $n^{th}$ iteration, the parameters of the latent feature extractor have not changed by more than a predefined threshold, and
    wherein the pre-trained latent feature extractor is configured to be provided to the industrial neural network when training the industrial neural network for a specific task.

16. The system of claim 15, wherein the system further comprises:
  a normalizer module configured to execute upstream of the latent feature extractor.

17. The system of claim 15, wherein the latent feature extractor comprises 10 to 30 layers, and wherein each layer comprises 10 to 1000 neurons, and/or wherein the specific task module comprises 1 or 2 layers and each layer comprises 10 to 1000 neurons, and/or wherein the combiner module comprises 1 or 2 layers and each layer comprises 10 to 1000 neurons.

* * * * *